(12) United States Patent
Davis et al.

(10) Patent No.: X9469
(45) Date of Patent: Mar. 4, 1836

(54) MISSING

(76) Inventors: Frederick Davis; William Ashdown

Frederick Davis and William Ashdown, of Baltimore Md.

Letters Patent.

The Schedule referred to in these Letters Patent and making part of the same containing a description in the words of the said Frederick Davis and William Ashdown themselves of their improvement on George W. Cleavland's improvement on Rail Road Cars.

To all To whom these presents shall come. Be it Known that we Frederick Davis and William Ashdown of the City of Baltimore and State of Maryland have invented a new and useful improvement on George W. Cleaveland's improvement in the Rail Road Car which was patented to him in the fall of 1830. and that the following drawings and remarks are a full and exact description of our improvement. The object of our improvement is to produce regularity in the motion and direction of the wheels on the rails or prevent their liability to move in a zig zag. line. or to prevent the constant liability of the flanges of the wheels coming into contact with the rails. Instead of one solid axle Mr Cleaveland has his separated in the middle. The square frame fig 1. represents a mechanical contrivance which supports the inner end of each pair of axles and allows both to vibrate horizontally. and they revolve independently of each other; whilst they always remain parallel with each other. The dotted lines and the seal a. show where one of the inner gudgeons of each axle rests. the gudgeon of the other axle being on the opposite side Fig 2. represents the working parts of Fig 1. a being the same piece in both figs. B. is a pivot lever the rounded ends of which rest in the inner holes of the boxes or pieces a, b, c. when by means of the [illegible] the Box is moved to the right hand or forward. the box c is moved to the left or backwards. Fig 3. represents the connection of our apparatus with Mr Cleaveland's. by means of the elevation of the pin through the middle. We make the pin fast to the lever as may be seen by the square frame at, d. then by a square and at the top we attach the lever e. which works with the pin and pivot lever f f. are sections of rods connected with e. by working joints. Fig 4. Represents a top view of the centre piece of the car. The dotted lines represent the relative position of the axles on [illegible]

curved Road. the outer and larger curve or track being from you g. g. are from
as Fig 1. h. h. are levers. as e e in Fig 8. i. i. i. i. are rods connected with the
levers h. h. and the bent levers k. & l. by working joints. the bent levers
at m. m. have working joints by means of bolts in the pack. on the end
of each of the bent levers at n. is an upright fixed pin as a medium of
connection with other cars or moving forces. When either of the bent levers
move in the direction of the arrows. by means of its connection with cars or
other moving force, the inner end of the axles as at o. o. are brought nearer
together. When each set of the levers and axles are on the same line with
each other the car is in a position for a straight track and by throwing the
axles into a position opposite to that in which they now stand the car
will be in a position for opposite curves. By the use of our fixtures the
flanges of the cars will be kept almost, if not quite at all times free
from the rails as these levers draw the car on a line of the chord of the [illegible]
or nearer to the inner track, whereas without this provision the car will [illegible]
ly turn by means of the rubbing of the flanges against the outer rail. The
traction of the forward power has a tendency to keep the axles on the same
lines and consequently no tendency will remain to produce an irregular
or zig-zag direction in the running of the car. We claim the appenda-
ges for the purposes of governing and regulating the motion of the axles, and
wheels as above described Exd. Witnesses
[illegible] John W Post
J B Bosley Frederick Davis
William Ashdown